(12) United States Patent
Fung

(10) Patent No.: US 9,049,844 B2
(45) Date of Patent: Jun. 9, 2015

(54) PET DESHEDDER APPARATUS

(71) Applicant: Conair Corporation, Stamford, CT (US)

(72) Inventor: Kam Fai Fung, Hong Kong (CN)

(73) Assignee: Conair Corporation, Stamford, CT (US)

( * ) Notice: Subject to any disclaimer, the term of this patent is extended or adjusted under 35 U.S.C. 154(b) by 0 days.

(21) Appl. No.: 13/836,040

(22) Filed: Mar. 15, 2013

(65) Prior Publication Data

US 2014/0261226 A1 Sep. 18, 2014

(51) Int. Cl.
*A01K 13/00* (2006.01)

(52) U.S. Cl.
CPC ............. *A01K 13/003* (2013.01); *A01K 13/00* (2013.01)

(58) Field of Classification Search
CPC ....... A01K 13/00; A01K 13/002; B26B 21/16
USPC ................ 119/625, 627, 628, 630, 631, 633; 30/162, 155–161
IPC ...................................................... A01K 13/00
See application file for complete search history.

(56) References Cited

U.S. PATENT DOCUMENTS

| | | | |
|---|---|---|---|
| 2,874,463 A | | 2/1959 | Andis |
| 4,575,416 A | * | 3/1986 | Chester et al. ........... 208/111.35 |
| 4,779,572 A | | 10/1988 | Freulon |
| 4,860,692 A | | 8/1989 | Beard |
| 4,936,259 A | | 6/1990 | Owen et al. |
| 5,178,168 A | | 1/1993 | Kantor |
| 5,315,959 A | | 5/1994 | Podkowa |
| 5,339,840 A | * | 8/1994 | Koppel ......................... 132/151 |
| 5,365,881 A | | 11/1994 | Sporn |
| 5,503,109 A | | 4/1996 | Sporn |
| 5,655,482 A | | 8/1997 | Lundquist |
| 5,926,902 A | | 7/1999 | Pierre |
| 6,213,055 B1 | | 4/2001 | Willinger et al. |
| 6,279,582 B1 | | 8/2001 | Wang |
| 6,427,633 B1 | | 8/2002 | Ogden |
| 6,450,127 B2 | | 9/2002 | Willinger et al. |

(Continued)

OTHER PUBLICATIONS

International Search Report for International Application No. PCT/US 14/21619, dated Jun. 16, 2014, 3 pages.

*Primary Examiner* — Shadi Baniani
*Assistant Examiner* — Magdalena Topolski
(74) *Attorney, Agent, or Firm* — Carter, DeLuca, Farrell & Schmidt, LLP

(57) ABSTRACT

A system for removal of hair includes an instrument having a frame with a trailing handle segment and a leading treatment segment, a manually manipulative actuator mounted relative to the trailing handle segment of the frame and a drive member operatively coupled to the actuator and extending at least partially within the leading treatment segment of the frame. The drive member is movable between an initial condition and a deployed condition in response to corresponding movement of the actuator. A blade assembly is mountable relative to the leading treatment segment of the frame. The blade assembly includes a blade housing mountable relative to the treatment segment of the frame, a blade mounted to the blade housing and having hair teeth for grooming a pet and an ejector member mounted relative to the blade housing. The ejector member is couplable to the drive member of the instrument and positioned to facilitate removal of hair from the blade upon movement toward the advanced position.

9 Claims, 11 Drawing Sheets

(56) References Cited

U.S. PATENT DOCUMENTS

| | | |
|---|---|---|
| 6,782,846 B1 | 8/2004 | Porter et al. |
| 6,874,446 B2 | 4/2005 | Plante et al. |
| 6,955,137 B2 | 10/2005 | Dunn et al. |
| 7,077,076 B2 | 7/2006 | Porter et al. |
| 7,089,945 B1 | 8/2006 | Barge |
| 7,222,588 B2 | 5/2007 | Porter et al. |
| 7,225,815 B2 | 6/2007 | Kung |
| D558,934 S | 1/2008 | Khubani |
| 7,334,540 B2 | 2/2008 | Porter et al. |
| 7,353,777 B2 | 4/2008 | Morosin et al. |
| D570,557 S | 6/2008 | Khubani et al. |
| 7,509,926 B2 | 3/2009 | Porter et al. |
| 7,650,857 B2 | 1/2010 | Porter et al. |
| 7,650,858 B2 | 1/2010 | Porter et al. |
| D613,004 S | 3/2010 | Lin |
| D613,005 S | 3/2010 | Lin |
| D614,819 S | 4/2010 | Lin |
| 7,717,067 B2 | 5/2010 | Porter et al. |
| 7,739,769 B2 | 6/2010 | DiPippo |
| D626,295 S | 10/2010 | Porter |
| D626,296 S | 10/2010 | Porter |
| D626,297 S | 10/2010 | Porter |
| 7,854,214 B2 | 12/2010 | Khubani et al. |
| 8,505,492 B2 * | 8/2013 | Werner et al. .................. 119/609 |
| 8,555,463 B1 * | 10/2013 | Laube .......................... 15/415.1 |
| 2007/0044604 A1 | 3/2007 | Andis et al. |
| 2007/0084416 A1 | 4/2007 | Liao |
| 2008/0066690 A1 | 3/2008 | Rosen |
| 2008/0078333 A1 | 4/2008 | Wang |
| 2008/0235951 A1 | 10/2008 | Groh |
| 2009/0126648 A1 | 5/2009 | Porter et al. |
| 2009/0272331 A1 | 11/2009 | Lin |
| 2009/0272332 A1 | 11/2009 | Lin |
| 2009/0272333 A1 | 11/2009 | Lin |
| 2010/0154718 A1 | 6/2010 | Porter et al. |
| 2010/0162965 A1 | 7/2010 | Porter et al. |
| 2011/0048336 A1 | 3/2011 | Lin |
| 2011/0067644 A1 | 3/2011 | Prochaska |

* cited by examiner

PET DESHEDDER APPARATUS

BACKGROUND

1. Field of the Invention

The present invention relates to a pet deshedder apparatus for removal of excess or loose hair from a pet, and further relates to a deshedder apparatus having improved capacity for hair removal and with interchangeable blade assemblies.

2. Description of Related Art

Combs and/or brushes for removal of hair from a pet are known in the art. Generally, these devices incorporate bristles or teeth, which capture excess hair from the pet during a combing/brushing process. However, these known devices are generally deficient with regard to subsequent removal of the hair from the comb or brush. In addition, known devices lack flexibility concerning choice of comb or brush type for use during the deshedding procedure.

SUMMARY

Accordingly, the present disclosure relates to a system for removal of hair. The system includes an instrument having a frame with a trailing handle segment and a leading treatment segment, a manually manipulative actuator mounted relative to the trailing handle segment of the frame and a drive member operatively coupled to the actuator and extending at least partially within the leading treatment segment of the frame. The drive member is movable between an initial condition and a deployed condition in response to corresponding movement of the actuator. A blade assembly is mountable relative to the leading treatment segment of the frame. The blade assembly includes a blade housing mountable relative to the treatment segment of the frame, a blade mounted to the blade housing and having hair teeth for grooming a pet and an ejector member mounted relative to the blade housing. The ejector member is couplable to the drive member of the instrument and movable relative to the blade housing between a retracted position and an advanced position in response to corresponding respective movement of the drive member between the initial condition and the deployed condition thereof. The ejector member is positioned adjacent the blade and dimensioned to facilitate removal of hair from the blade upon movement toward the advanced position.

In one embodiment, the blade assembly is releasably mountable to the frame of the instrument. The instrument may include a blade release mounted relative to the leading treatment segment of the frame of the instrument. The blade release is movable relative to the frame between a first secured position where the blade assembly is secured to the frame of the instrument and a second release position where the blade assembly is releasable from the frame. The blade release may include a locking detent, which is engagable with the blade housing when the blade ejector is in the first secured position. The blade release may be slidable relative to the leading treatment segment of the frame between the first secured position and the second release position thereof. Alternatively, the blade release is adapted for at least pivotal movement relative to the leading treatment segment of the frame between the first secured position and the second release position thereof. The blade release member may be normally biased to the first secured position. The drive member also may be normally biased to the initial condition. Two blade assemblies may be provided with each one releasably mountable to the instrument.

BRIEF DESCRIPTION OF THE DRAWINGS

Various embodiments of the present disclosure are described hereinbelow with references to the drawings, wherein.

DETAILED DESCRIPTION OF THE EMBODIMENTS

Figure 1:
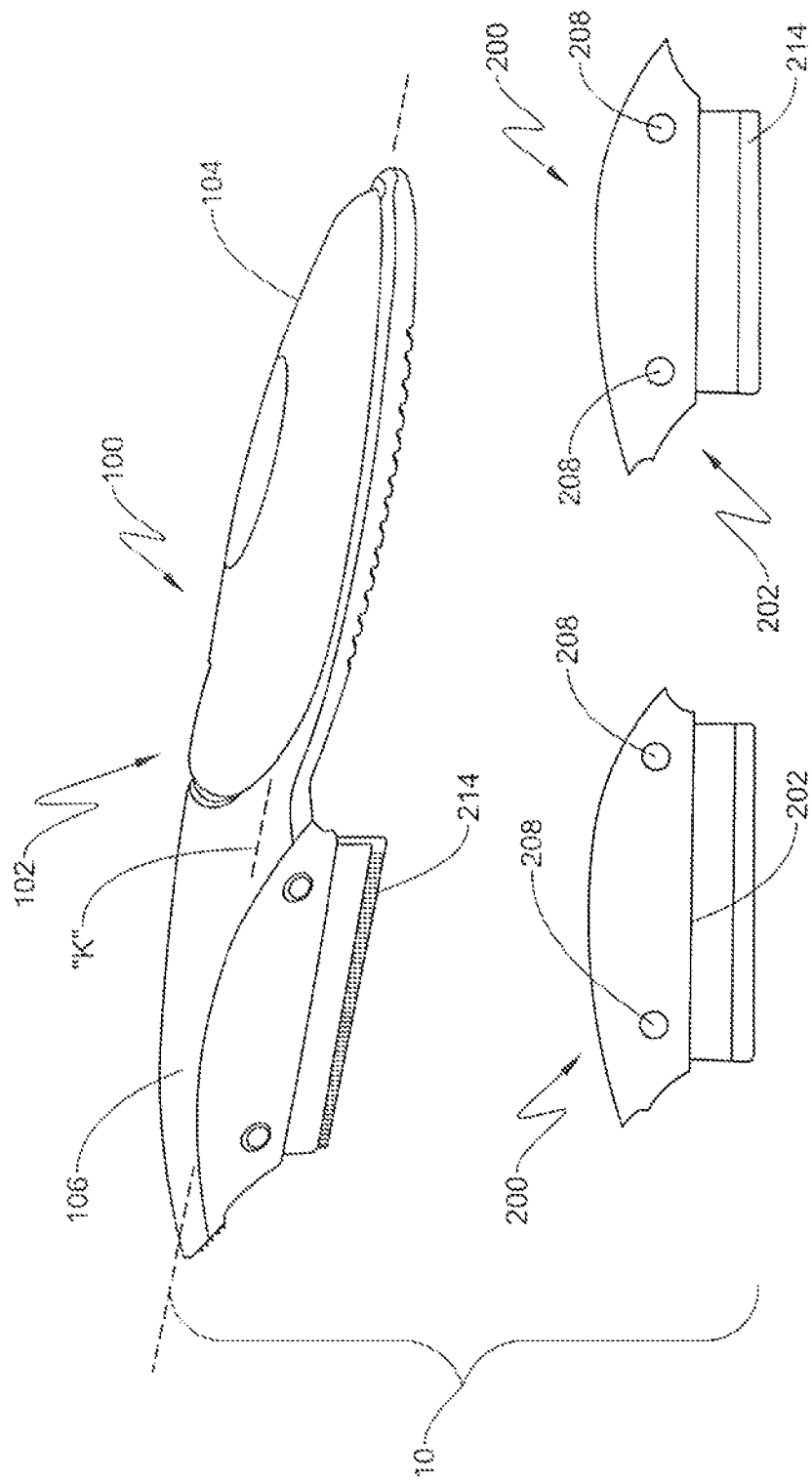
FIG. 1 is a perspective view of the pet deshedder apparatus in accordance with the principles of the present invention illustrating the applicator instrument and two releasably mountable blade assemblies with the applicator instrument.
Figure 2:
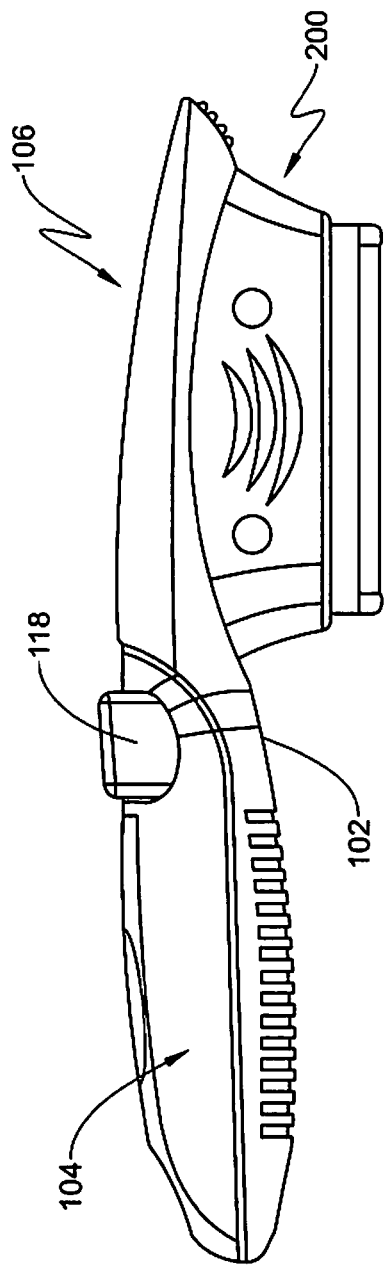
FIG. 2 is a side plan view of the pet deshedder apparatus.
Figure 3:
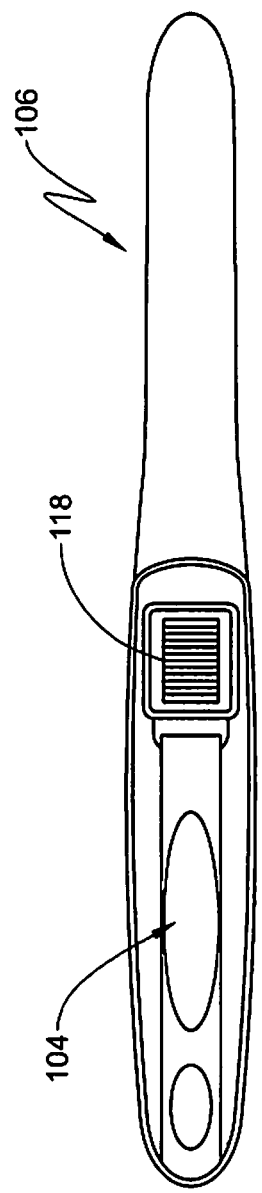
FIG. 3 is a top plan view of the pet deshedder apparatus.

Referring now to the drawings and, in particular, to FIG. 1, there is shown a pet deshedder apparatus in accordance with the principles of the present disclosure. Pet deshedder apparatus 10 is intended for removal of a pet's hair, including, e.g., the hair of a cat or dog, which may be released during seasonal shedding. The pet deshedder apparatus 10 is particularly adapted for grooming of the pet to remove excess loose hair, minimize the potential of knots and tangles and/or removing of pet dander in the home.

Generally, the pet deshedder apparatus 10 includes an applicator instrument 100 and at least one, possibly two or more blade assemblies 200 which are releasably mountable to the applicator instrument 100. In FIG. 1, one blade assembly 200 is illustrated mounted to the applicator instrument 100 and two alternative/replacement blade assemblies 200 are also shown. Applicator instrument 100 includes a frame 102 having a handle segment 104 and a treatment segment 106 disposed at the end of the handle segment 104. The frame 102 defines a longitudinal axis "k" extending along at least the length of the handle segment 104. The handle segment 104 is dimensioned for engagement by the user and may include surface contours, which provide ease of grip. The treatment segment 106 of the frame 102 houses the blade assembly 200.

With reference to FIGS. 2-5, in conjunction with FIG. 1, the handle segment 104 includes a handle cover 108, a cover plate 110 positioned over the cover plate 110 and a label 112. The handle cover 108 encloses the internal components of the handle segment 104 and may be formed of a suitable relatively rigid material including, e.g., polymeric materials or metallic materials. The handle cover 108 is connected to the handle segment 104 of the frame 102 through conventional means including a tolerance fit, snap fit, adhesives, screws or the like. The cover plate 110 encompasses the handle cover 108 and is fabricated from a material, which facilitates engagement of the handle segment 104. For example, the cover plate 110 may comprise an elastomer or the like to enhance gripping engagement by the user. The label 112 may include any indicia, logo, information of use, etc.

The handle segment 104 further includes a liner member 114, a drive member or drive member 116 and a manually manipulative actuator or actuator 118 each being at least partially housed within the handle segment 104 of the frame 102 and the handle cover 108. The liner member 114 is secured to the handle segment 104 of the frame 102 with at least two screws or fasteners 120. The liner member 114 may include a plurality of lock tabs 122, which engage corresponding structure (e.g., locking detents or recesses (not shown)) of the handle cover 108 to connect the handle cover 108 to the handle segment 104 of the frame 102.

The drive member 116 is pivotally mounted to the handle segment 104 of the frame 102 about a pivot pin 124 defining a pivot axis "m". The pivot pin 124 is mounted to the handle segment 104 of the frame 102 and received within a corresponding opening 126 at the end of the drive member 116. The drive member 116 may be biased to the upward or initial condition of FIG. 5 through torsion spring 129 shown in FIG. 4. The torsion spring 129 may have one end connected to the handle cover 108 and a second end connected to the drive member 11b. The actuator 118 is at least partially received within corresponding respective openings 108a, 110a of the handle cover 108 and the cover plate 110, and is operably connected to the drive member 116 via a mounting pin 128. The actuator 118 may translate in a vertical direction "b" (e.g., transverse to the longitudinal axis "k") within the openings 108a, 110a to effect pivotal movement of the drive member 116 about the pivot axis "m" from the initial condition of FIG. 5 to the deployed condition of FIG. 6.

The treatment segment 106 of the frame 102 includes an internal housing 130 which may be secured to the frame 102 via screws or the like. The internal housing 130 includes a central opening 131 which permits reception and passage of the leading end of the drive member 116. A blade release 132 is mounted adjacent the leading end of the treatment segment 106 of the frame 102. The blade release 132 is received within correspondingly dimensioned openings within the treatment segment 106 and the internal housing 130. In one embodiment, the blade release 132 is capable of reciprocating motion within the opening in the direction of directional arrows "t" to release and secure the blade assembly 200. The blade release 132 includes a locking shelf or detent 134 which is engagable with the blade assembly 200 as will be discussed hereinbelow. The outer surface of the blade release 132 may include serrations 136 or the like to facilitate engagement with the blade release 132. A coil spring 138 normally biases the blade release 132 in an outward direction relative to the treatment segment 106 of the frame 102 corresponding to a lock position of the blade release 132.

Figure 4:
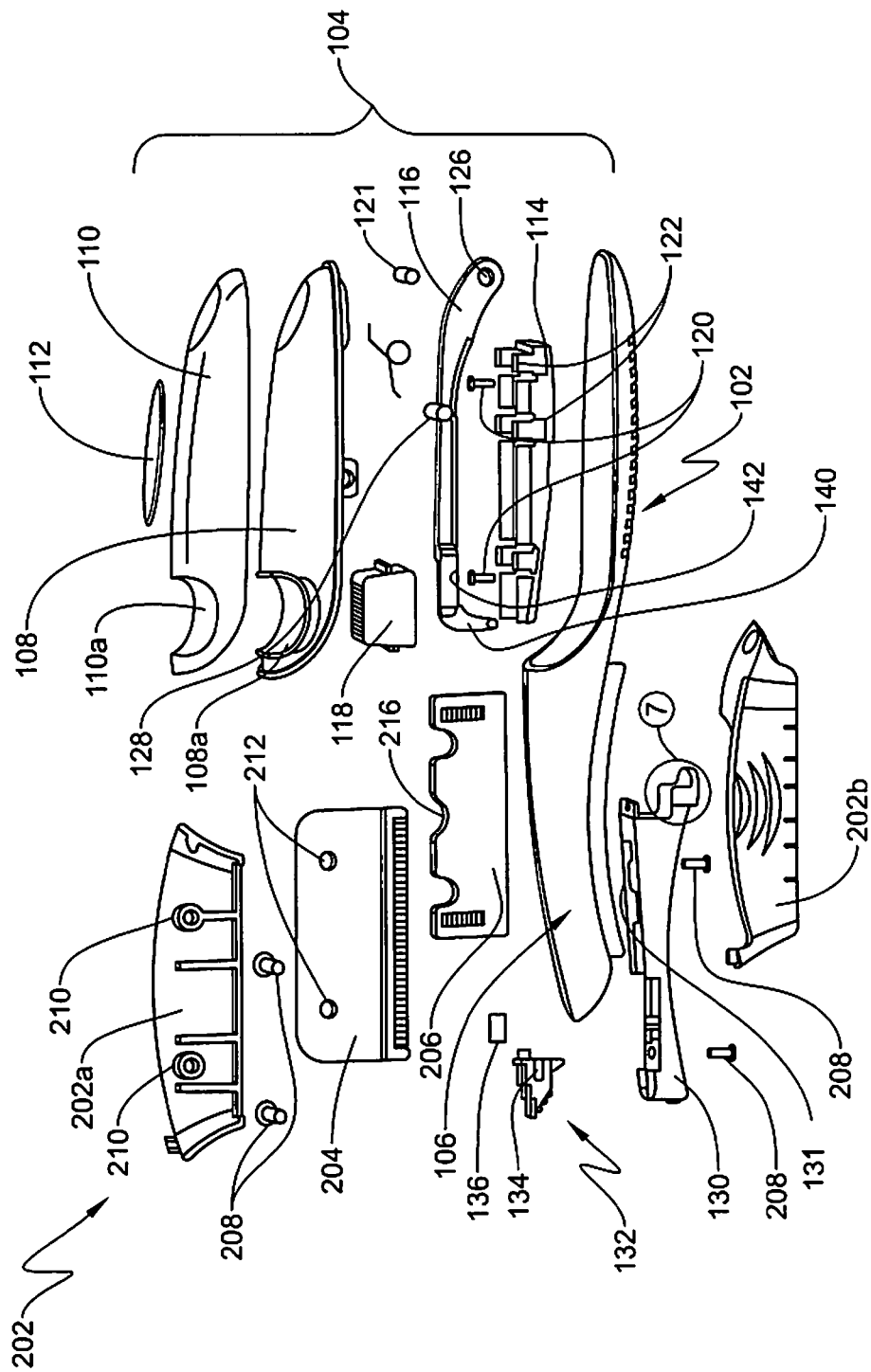
FIG. 4 is an exploded perspective view of the pet deshedder apparatus including the applicator instrument and one of the blade assemblies.
Figure 5:
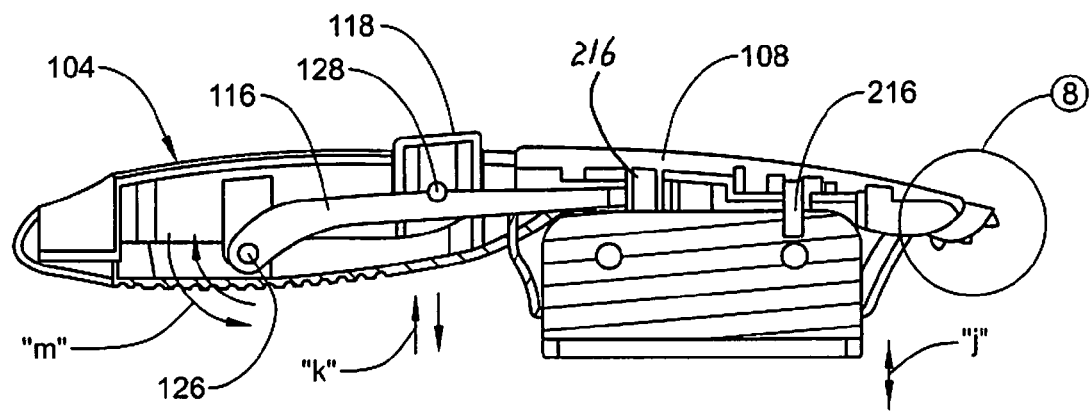
FIG. 5 is a side cross-sectional view of the pet deshedder apparatus in an initial condition for use in brushing a pet's hair.
Figure 6:
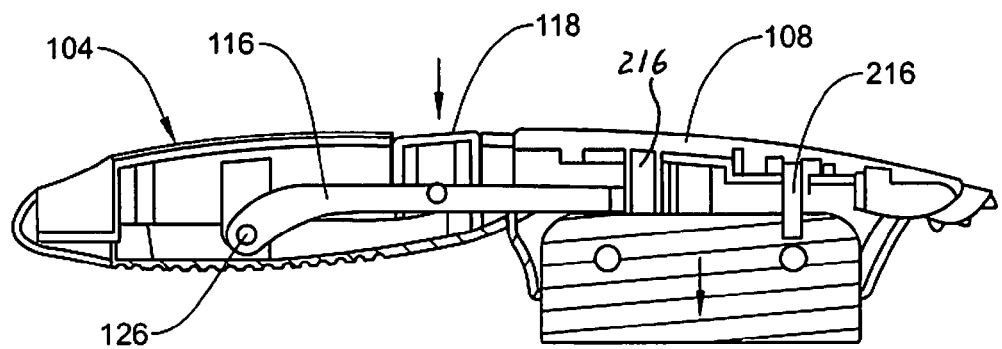
FIG. 6 is a side cross-sectional view of the pet deshedder apparatus in an actuated condition for removal of the pet's hair from the apparatus.

With reference now to FIGS. 1, 4 and 5, the blade assembly 200 will be discussed. The blade assembly 200 is releasably mounted to the frame 102 of the apparatus 10. The blade assembly 200 includes a blade housing 202 consisting of first and second housing members 202a, 202b, a blade 204 and an ejector member or plate 206. The blade housing 202 is secured to the blade 204 via a pair of fasteners 208, which are received within corresponding respective openings 210, 212 of the first housing member 202a and the blade 204. The fasteners 208 may be threadably received within threaded apertures of the second housing 202b to connect the components. Through this arrangement, the blade 204 is fixed relative to the blade housing 202. The blade 204 incorporates teeth or bristles 214 (FIG. 1) at one end which are used to comb or brush the pet.

The ejector plate 206 is mounted for movement within the blade housing 202 in the direction of directional arrows "j" to selectively remove hair which may accumulate within the teeth 214 of the blade 204 during grooming. In one embodiment, the ejector plate 206 includes an upper recess 215 which is engaged by the depending segment 140 and/or shelf 142 of the drive member 114 such that movement of the actuator 118 in the downward direction causes corresponding downward motion of the ejector blade 206 from the retracted position of FIG. 5 to the advanced position depicted in FIG. 6. The drive member 116 may be connected to the ejector plate 206. Accordingly, upon release of the actuator 118, the actuator 118, the drive member 116 and the ejector plate 206 return under the influence of the torsion spring 129 to the initial condition of FIG. 5. In another embodiment, the ejector plate 206 is normally biased in the upward direction within the blade housing through coil springs 216. At one end, each coil spring 216 is secured to the blade 204 and at the other end each coil spring 216 is secured to the blade housing 202 (see FIGS. 5 and 6). Any means for securing the coil springs 216 to the ejector plate 206 and the blade housing 202 are envisioned.

Figure 7:
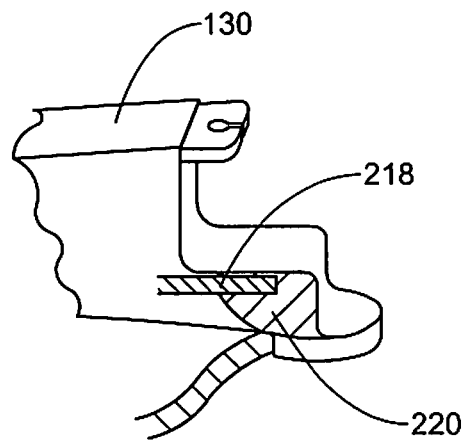
FIG. 7 is an enlarged isolated view in cross-section of the area of detail depicted in FIG. 2 illustrating a mechanism for securing the trailing end of the blade assembly to the applicator instrument.
Figure 8:
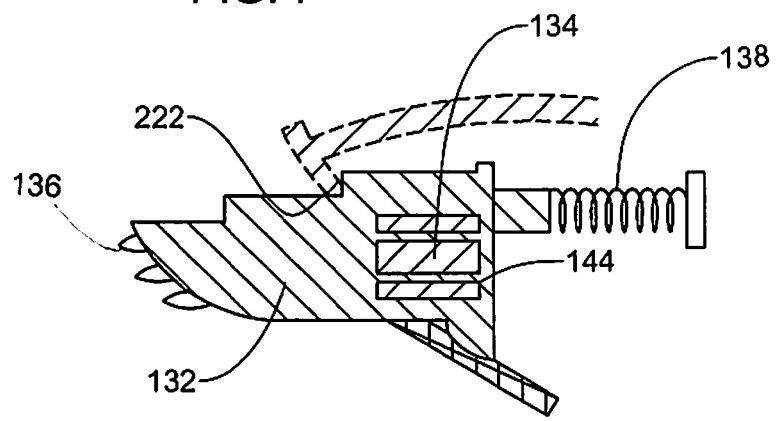
FIG. 8 is an enlarged isolated view in cross-section of the area of detail depicted in FIG. 5, illustrating the blade release in a first ejector position where the blade assembly is secured to the applicator instrument.

As best depicted in FIG. 7 in conjunction with FIG. 4, the assembled housing components constituting the blade housing 202 define an opening 218 at one end which receives a correspondingly sized mounting projection 220 defined within the internal housing 130 of the frame 102 in snap relation therewith. The other end of the blade housing 202 defines an opening 222, which at least partially accommodates the blade release 132 as depicted in FIG. 8.

Figure 9:
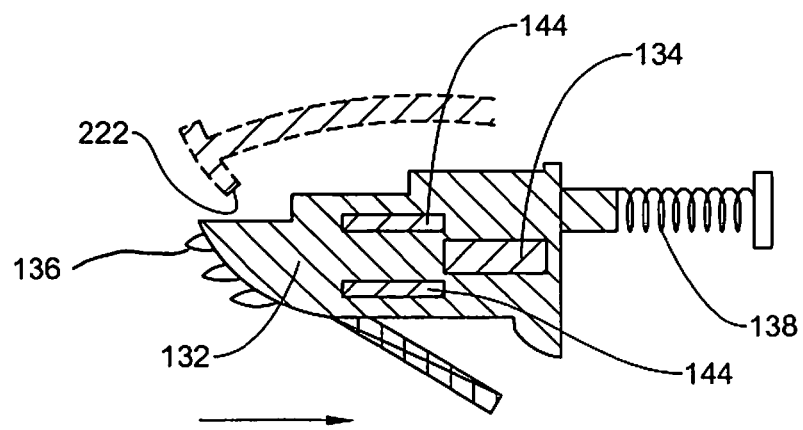
FIG. 9 is a view similar to the view of FIG. 8 illustrating the blade release in a second ejector position permitting removal of the blade assembly from the applicator instrument.
Figure 10:
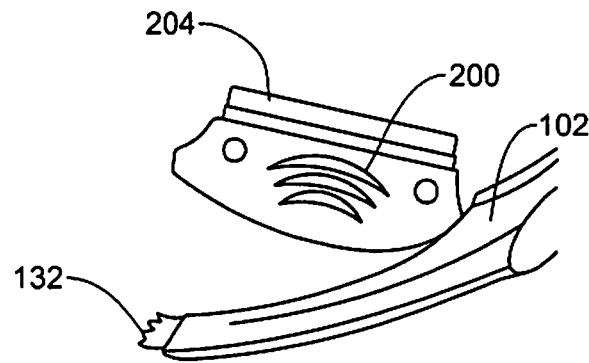
FIGS. 10-12 illustrate a sequence of steps for mounting a blade assembly to the applicator instrument.
Figure 11:
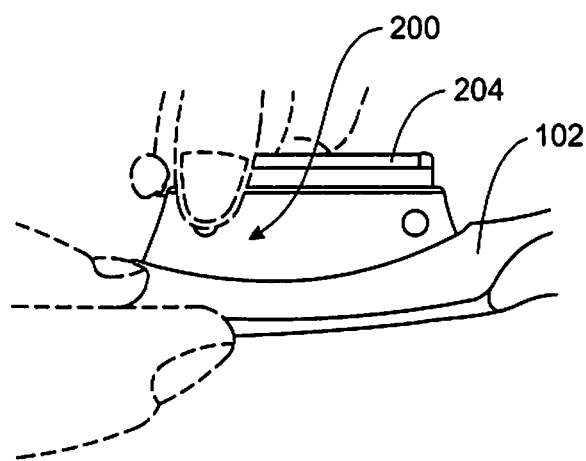
Figure 12:
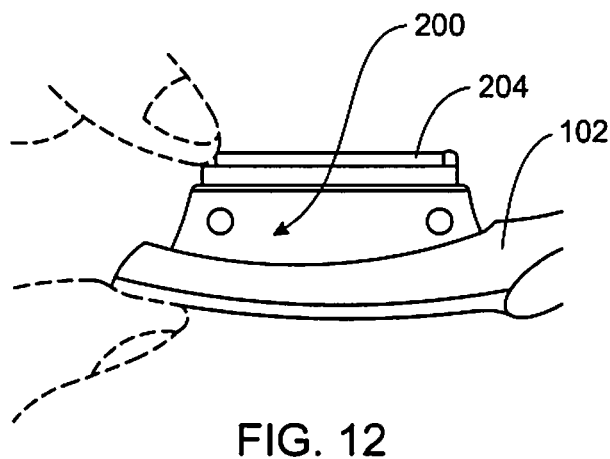
Figure 13A:
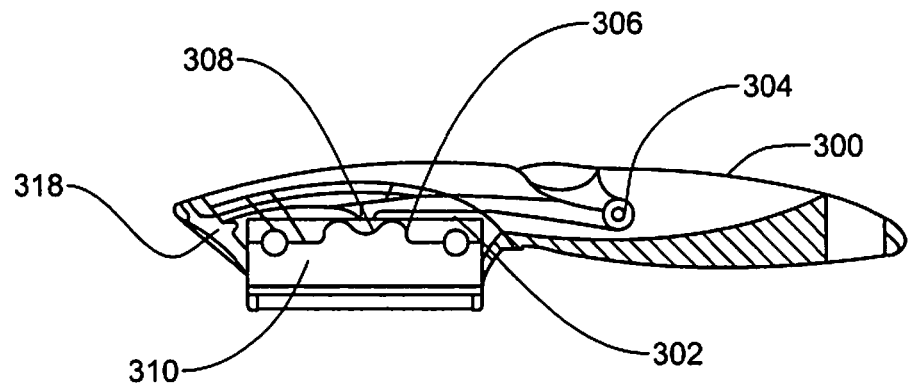
FIG. 13A is a side cross-sectional view of another embodiment of the deshedder apparatus in accordance with the principles of the present invention.
Figure 13B:
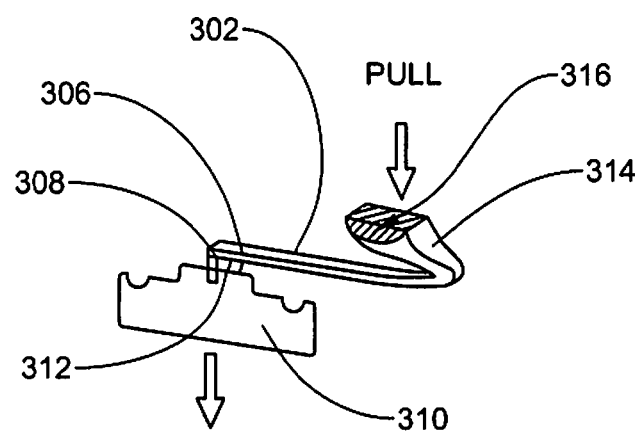
FIG. 13B is a perspective view illustrating the actuator and drive member of the embodiment of FIG. 13A.
Figure 14:
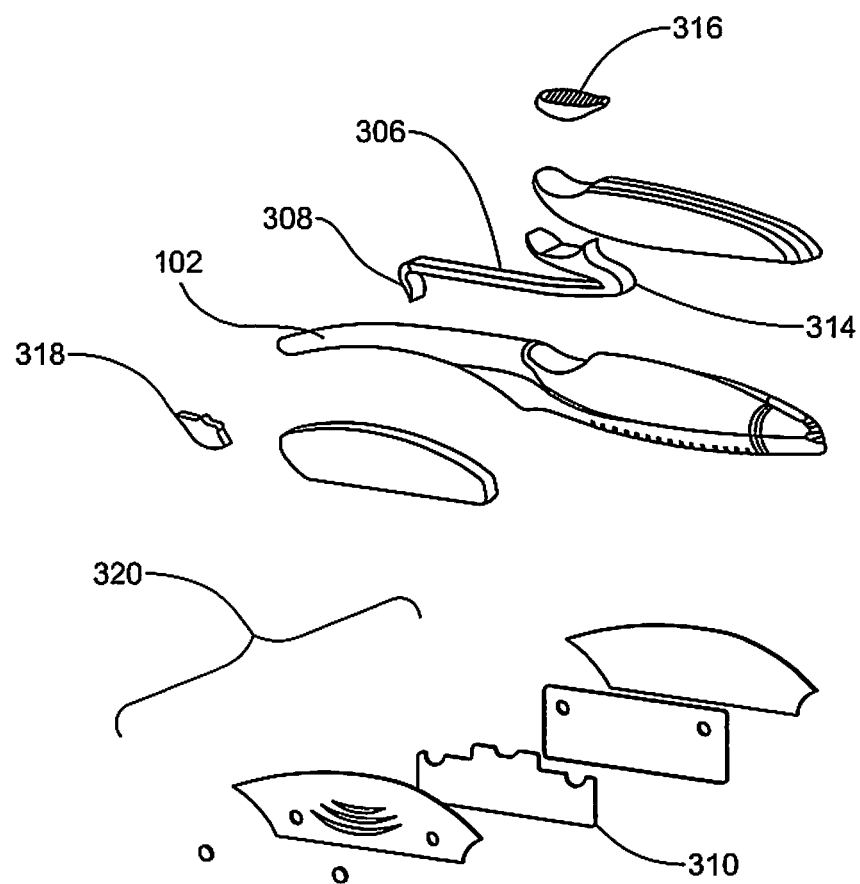
FIG. 14 is an exploded perspective view of the applicator instrument of the embodiment of FIG. 13.
Figure 15:
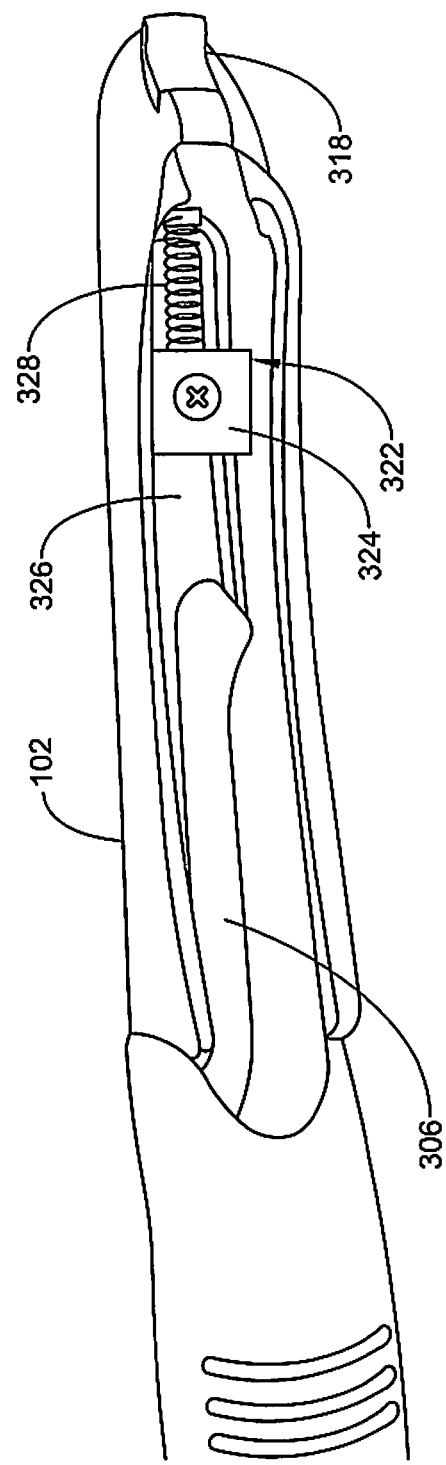
FIG. 15 is an enlarged isolated perspective view of the applicator instrument, illustrating the blade release in a first ejector position where the blade assembly is secured to the applicator instrument.

The assembly of the blade assembly 202 to the frame 102 of the applicator instrument 100 will now be discussed. With reference to FIG. 10, the blade assembly 200 is rotated relative to the longitudinal axis "k" of the frame 102 and the opening 218 of the blade housing 202 is advanced to receive the mounting projection 220 of the internal housing 130 of the frame in snap relation therewith see FIG. 7. Thereafter, the blade assembly 200 is rotated (FIG. 11) about the mounting projection 220 to position the remote end of the blade assembly 200 adjacent the leading end of the treatment segment 106 of the frame 102. The blade release 132 is depressed inwardly against the bias of spring 138 whereby the locking shelf 134 of the blade release 132 is positioned to clear the locking element 144 of the blade housing 202 permitting insertion of the blade housing 202 at least partially within the treatment segment 106 of the frame 102 (FIGS. 9 and 12). Subsequently, the blade release 118 is released to assume its normal lock position under the bias of coil spring 138 (FIGS. 8 and 11). In this position, the locking element 134 of the blade release 118 is in secured relation with the locking element 144 of the internal housing 130 as depicted in FIG. 8.

The apparatus 10 may then be used to groom the pet. After one or more brushing strokes, in the event hair remains caught within the teeth 214 of the blade 204, the actuator 118 may be depressed or moved from the position shown in FIG. 5 to the position shown in FIG. 6, to cause pivotal movement of the drive member 116 about the pivot pin 121 resulting in downward movement of the ejector blade 206 to the position depicted in FIG. 6. During this movement of the ejector plate 206, the ejector plate 206 engages the hair caught in the teeth 212 of the blade 204 to release it from the blade 204. After each depression of the blade actuator 118, the ejector plate 206 is returned to the normal condition of FIG. 5 as discussed herein.

In the event, it is desired to change out the blade assembly 200 for a smaller blade assembly 200 (see, e.g. FIG. 1), the blade release 132 is depressed to clear the locking element 144 of the internal housing 130, and the blade assembly 200 is rotated away from the treatment segment 106. The other end of the blade assembly 200 is pulled away from the treatment segment 106 with sufficient force to overcome the snap or tolerance fit between the mounting projection 220 and the opening 218 in the internal housing 130 of the frame 102. Another blade assembly 200 may be mounted to the instrument 100 in a similar manner described in connection with FIGS. 10-12.

FIGS. 13A, 13B and 14-15 illustrate an alternate embodiment of the present disclosure. This embodiment is generally similar to the embodiment of FIGS. 1-12. However, in accordance with this embodiment, the applicator instrument 300 includes a push or drive member 302 which is mounted for pivotal movement about pivot pin 304. The drive member 302 includes a leading end 306 having an offset segment 308 secured to the ejector member 310 through conventional means such as fasteners 312, adhesives or the like. At the trailing end of the drive member 302, is actuator 314 having cover 316 which may include an irregular surface or elastomeric material to facilitate gripping engagement. The actuator 314 may be integrally formed with the drive member 302 or may be a separate component as shown. Application of a downward force to the actuator 314 effects downward movement of the ejector member 310 in a similar manner as previously discussed.

Figure 16:
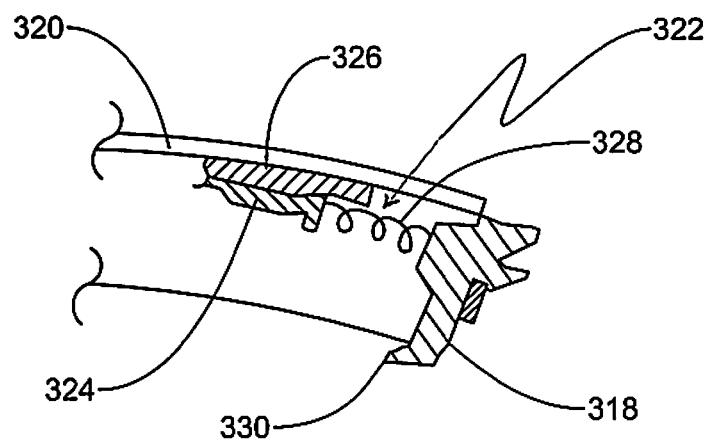
FIG. 16 is a cross-sectional view of the blade release in the first ejector position.
Figure 17:
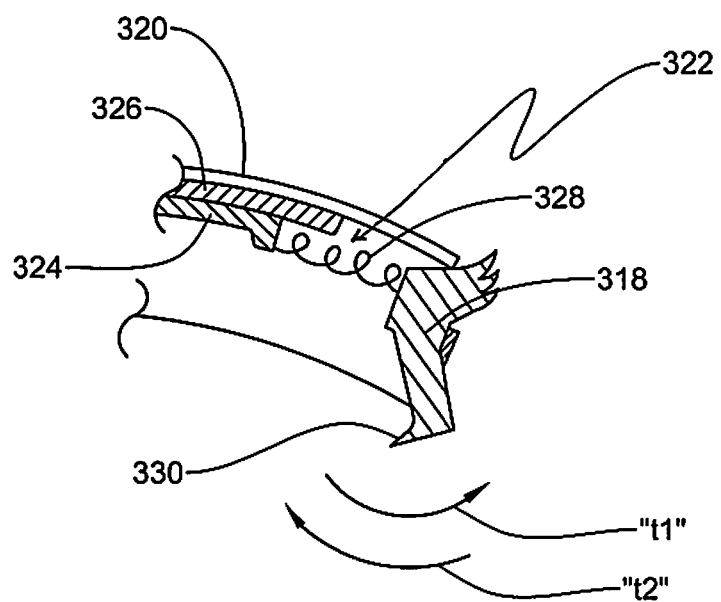
FIG. 17 is a view similar to the view of FIG. 16 illustrating the blade release in a second ejector position permitting removal of the blade assembly from the applicator instrument.

The blade release 318 is mounted for pivotal movement within the blade housing 320. In one embodiment, the blade release 318 is confined at the leading end of the housing 320 and is capable of rocking in pivoting manner within the blade housing 320 between a first secured position depicted in FIG. 16 and a second release position depicted in FIG. 17 as shown by pivoting arrows "t1, t2", respectively. The blade release 318 may be normally biased to the first secured position of FIGS. 15 and 16 by coil spring mechanism 322. The coil spring mechanism 322 may include a spring housing 324 which is secured to the internal housing 326 of the blade housing 320 and a coil spring 328 which is secured at one end to the spring housing 324 and at the other end to the blade release 318. The blade release 318 includes a locking detent 330 which may engage corresponding structure of the blade assembly to secure the instrument 300.

Figure 18:
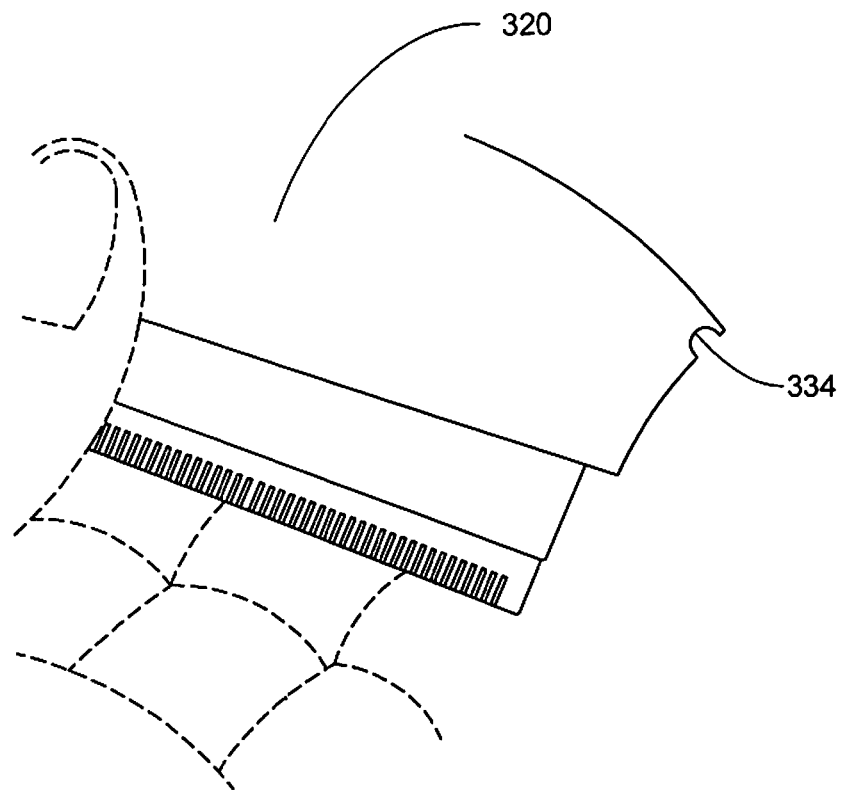
FIGS. 18-19 illustrate a sequence of steps for mounting a blade assembly to the applicator instrument of FIG. 13A.
Figure 19:
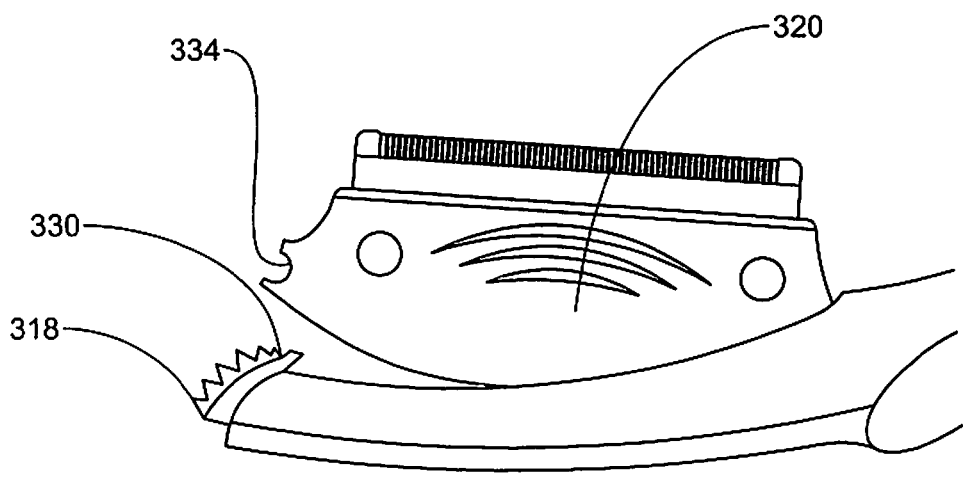

With reference to FIGS. 18-19, to load the blade assembly, the blade housing 320 is positioned relative to the frame 102 of the instrument where snap hook 334 of the blade housing is positioned adjacent the blade housing 320 and advanced to receive corresponding structure of the blade housing 332, e.g., the mounting projection 220 of the internal housing 130 of the frame in snap relation therewith in a similar manner described in connection with FIG. 7. Thereafter, the blade housing 320 is rotated (FIG. 19) to position the remote end of the blade housing 320 adjacent the leading end of the treatment segment of the frame 102. The blade release 318 is pivoted to the position depicted in FIG. 17 against the bias of spring 328 to position the locking detent 330 of the blade release 318 to engage corresponding structure, e.g., a locking shelf or element 334, of the blade housing 320 (see FIG. 19). The blade housing 320 is continued to be advanced until the blade release 318 engages the blade housing (via coordinating action of the locking detent 330 of the blade release 318 and the locking element 334 of the blade housing 320) to secure the components in a similar manner as shown, e.g., in FIG. 12. The blade release 318 is biased toward its normal secured position through coil spring mechanism 322. Release of the blade housing 318 and the blade assembly may be affected through rotating the blade release 318 toward the position of FIG. 17 which causes release of the locking detent 330 with the locking element 334.

Although the illustrative embodiments of the present disclosure have been described herein with reference to the accompanying drawings, the above description, disclosure, and figures should not be construed as limiting, but merely as exemplifications of particular embodiments. It is to be understood, therefore, that the disclosure is not limited to those precise embodiments, and that various other changes and modifications may be effected therein by one skilled in the art without departing from the scope or spirit of the disclosure.

What is claimed is:

1. An apparatus for removal of hair, which comprises;
   an instrument including:
   a frame having a trailing handle segment and a leading treatment segment and defining a longitudinal axis;
   a manually manipulative actuator mounted to the trailing handle segment of the frame; and
   a drive member operatively coupled to the actuator and extending longitudinally at least partially within the leading treatment segment of the frame, the drive member movable between an initial condition and a deployed condition in response to corresponding movement of the actuator;
   a blade assembly releasably mounted to the leading treatment segment of the frame, the blade assembly including:
   a blade housing including at least one locking element;
   a blade mounted to the blade housing, the blade having teeth for grooming a pet; and
   an ejector member mounted relative to the blade housing, the ejector member being couplable to the drive member of the instrument and movable relative to the blade housing between a retracted position and an advanced position in response to corresponding respective movement of the drive member between the initial condition and the deployed condition thereof, the ejector member positioned adjacent the blade and dimensioned to facilitate removal of hair from the blade upon movement toward the advanced position; and
   a manually operable blade release mounted to the leading treatment segment of the frame, the blade release including a locking detent, the blade release being movable relative to the frame between a first secured position where the locking detent engages the locking element of the blade housing of the blade assembly to secure the blade assembly to the frame of the instrument and a second release position where the locking detent releases the locking element to permit removal of the blade assembly from the instrument; wherein the blade release is spring biased toward the first secured position.

2. The apparatus according to claim 1, wherein the blade release is adapted for slidable movement relative to the leading treatment segment of the frame between the first secured position and the second release position thereof.

3. The apparatus according to claim 1, wherein the blade release is adapted for at least pivotal movement relative to the leading treatment segment of the frame between the first secured position and the second release position thereof.

4. The apparatus according to claim 1, wherein the drive member is spring biased to the initial condition.

5. The apparatus according to claim 1, including two blade assemblies, each blade assembly releasably mountable to the instrument.

6. The apparatus according to claim 1, wherein the drive member is adapted for pivotal movement between the initial condition and the deployed condition.

7. The apparatus according to claim 1, wherein the ejector member is biased to the retracted position by a spring.

8. The apparatus according to claim 1, wherein the ejector member is biased toward the retracted position.

9. The apparatus according to claim 1, wherein the spring bias is including a spring mounted to the frame and operatively engageable with the blade release, the spring dimensioned to bias the blade release toward the first secured position.

* * * * *